United States Patent
Vander Lind et al.

(10) Patent No.: US 9,352,930 B2
(45) Date of Patent: May 31, 2016

(54) METHODS AND SYSTEMS FOR WINDING A TETHER

(71) Applicant: Google Inc., Mountain View, CA (US)

(72) Inventors: Damon Vander Lind, Alameda, CA (US); Elias Wolfgang Patten, Seattle, WA (US); Brian Hachtmann, San Martin, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/142,910

(22) Filed: Dec. 29, 2013

(65) Prior Publication Data

US 2015/0183615 A1    Jul. 2, 2015

(51) Int. Cl.
| | |
|---|---|
| *B65H 54/28* | (2006.01) |
| *F03D 9/00* | (2006.01) |
| *B65H 75/26* | (2006.01) |
| *B65H 55/04* | (2006.01) |

(52) U.S. Cl.
CPC ............ *B65H 54/28* (2013.01); *B65H 54/2896* (2013.01); *B65H 55/04* (2013.01); *B65H 75/265* (2013.01); *F03D 9/002* (2013.01); *B65H 2701/3914* (2013.01); *F05B 2240/921* (2013.01); *Y02E 10/725* (2013.01); *Y02P 70/30* (2015.11)

(58) Field of Classification Search
CPC ...... B64C 31/06; B64C 39/022; B65H 54/28; B65H 75/265; F03D 9/002
See application file for complete search history.

(56) References Cited

U.S. PATENT DOCUMENTS

| | | | | |
|---|---|---|---|---|
| 1,408,463 | A * | 3/1922 | Miles | 242/608.4 |
| 1,555,544 | A * | 9/1925 | Anthony | 242/587.1 |
| 2,967,683 | A * | 1/1961 | Crater | 244/110 A |
| 3,224,697 | A * | 12/1965 | Struble, Jr. | 242/388.7 |
| 3,395,893 | A * | 8/1968 | Kumpf | 242/397.3 |
| 4,071,205 | A | 1/1978 | Wieschel | |
| 8,738,198 | B2 * | 5/2014 | Schempf | 701/2 |
| 2009/0289148 | A1 | 11/2009 | Griffith et al. | |
| 2010/0013236 | A1 | 1/2010 | Carroll | |
| 2010/0026007 | A1 * | 2/2010 | Bevirt | 290/55 |
| 2011/0266395 | A1 | 11/2011 | Bevirt | |
| 2012/0055576 | A1 * | 3/2012 | Prusty et al. | 138/177 |
| 2013/0048235 | A1 * | 2/2013 | Dekker et al. | 160/319 |
| 2013/0115544 | A1 * | 5/2013 | Davidson et al. | 429/505 |
| 2013/0241208 | A1 | 9/2013 | Zanetti | |
| 2014/0361122 | A1 * | 12/2014 | Ruiterkamp | 244/154 |

FOREIGN PATENT DOCUMENTS

| | | |
|---|---|---|
| WO | 2013065987 A2 | 5/2013 |
| WO | 2013085800 A1 | 6/2013 |

OTHER PUBLICATIONS

International Search Report for PCT/US2014/071907 mailed Apr. 15, 2015.

* cited by examiner

*Primary Examiner* — Tien Dinh
*Assistant Examiner* — Christopher Hutchens
(74) *Attorney, Agent, or Firm* — McDonnell Boehnen Hulbert & Berghoff (57) ABSTRACT

Methods and systems are provided to wrap a faired tether around a drum. The tether may be connected to an aerial vehicle. The method may involve guiding a faired tether around an exterior surface of a drum, wherein the drum comprises a helical shaped step around the exterior surface that is configured to mate with at least part of the faired tether, and to stack subsequent layers of wrapped tether in a staggered manner along the longitudinal axis of the drum. The faired tether may be guided onto the step using one or more level winds.

10 Claims, 9 Drawing Sheets

METHODS AND SYSTEMS FOR WINDING A TETHER

BACKGROUND

Unless otherwise indicated herein, the materials described in this section are not prior art to the claims in this application and are not admitted to be prior art by inclusion in this section.

Wind is a source of renewable energy. Traditionally, wind energy has been used to tow watercraft or land craft via use of a sail. However, the sail is typically located close to the earth surface and does not take advantage of the stronger wind at higher altitudes. Aerial vehicles may be used to extract power from wind at such higher altitudes to turn a generator. Such aerial vehicles may be coupled to the generator using a tether. When not in use, the aerial vehicle and associated tether may be stored.

SUMMARY

Methods and systems for winding a tether of an aerial vehicle around a drum are described herein. When not in use, a tether may be stored by winding the tether around a drum. Embodiments described herein reduce compressive forces caused by successive wraps of the tether around the drum surface, which may maintain the integrity and thus prolong the useful life of the tether.

In one example embodiment, a faired tether is guided around an exterior surface of a drum, wherein the exterior surface of the drum comprises a helical shaped step extending around the drum circumference, along the longitudinal axis of the drum. The faired tether may be guided onto the steps of the drum using one or more guiding devices, such as one or more level winds.

In one aspect, a method may involve winding a faired tether of an aerial vehicle around a drum. The method may include guiding a first layer of the faired tether onto a step on an exterior surface of the drum, wherein the step extends in a helical shape along a longitudinal axis of the drum. Guiding the first layer may comprise mating the faired tether with the step. The faired tether may comprise a leading edge, a body portion, a tail portion, and a trailing edge. The method then may further include guiding a second layer of the faired tether onto the step in the helical shape such that a portion of the second layer is adjacent the first layer of the faired tether and another portion of the faired tether is adjacent to the step.

In another aspect, a system may include a faired tether connected to an aerial vehicle at one end of the faired tether, wherein the faired tether comprises a body portion and a tail portion, and a drum comprising a top, a bottom, and an exterior surface, with one or more steps on the exterior surface. The steps of the drum are configured to mate with the faired tether when the faired tether is wrapped around the drum.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

OVERVIEW

Illustrative embodiments relate to aerial vehicles, which may be used in a wind energy system, such as an Airborne Wind Turbine (AWT). In particular, illustrative embodiments may relate to or take the form of methods and systems for winding a faired tether attached to an aerial vehicle around a drum.

By way of background, an AWT may include an aerial vehicle that flies in a path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

When the aerial vehicle has completed a flight, the aerial vehicle and associated tether may be stored. Embodiments described herein relate to winding a faired tether around a drum for storage prior to another flight. For instance, some implementations may involve guiding a faired tether around a drum designed to stagger the wrapped tether along the longitudinal axis of the drum. Such a staggered configuration allows the faired tether to cool efficiently and may prevent wear on the faired tether due to heat and contact with other layers of the tether.

Moreover, other embodiments may relate to a system that includes a faired tether connected to an aerial vehicle at one end of the faired tether, a drum, and one or more guiding devices, such as one or more level winds. The guiding devices serve to position the faired tether as the faired tether is wound around the drum. The drum may comprise steps that are configured to mate with at least a portion of the faired tether as the faired tether winds around the drum.

ILLUSTRATIVE SYSTEMS

A. Airborne Wind Turbine (AWT)

Figure 1:
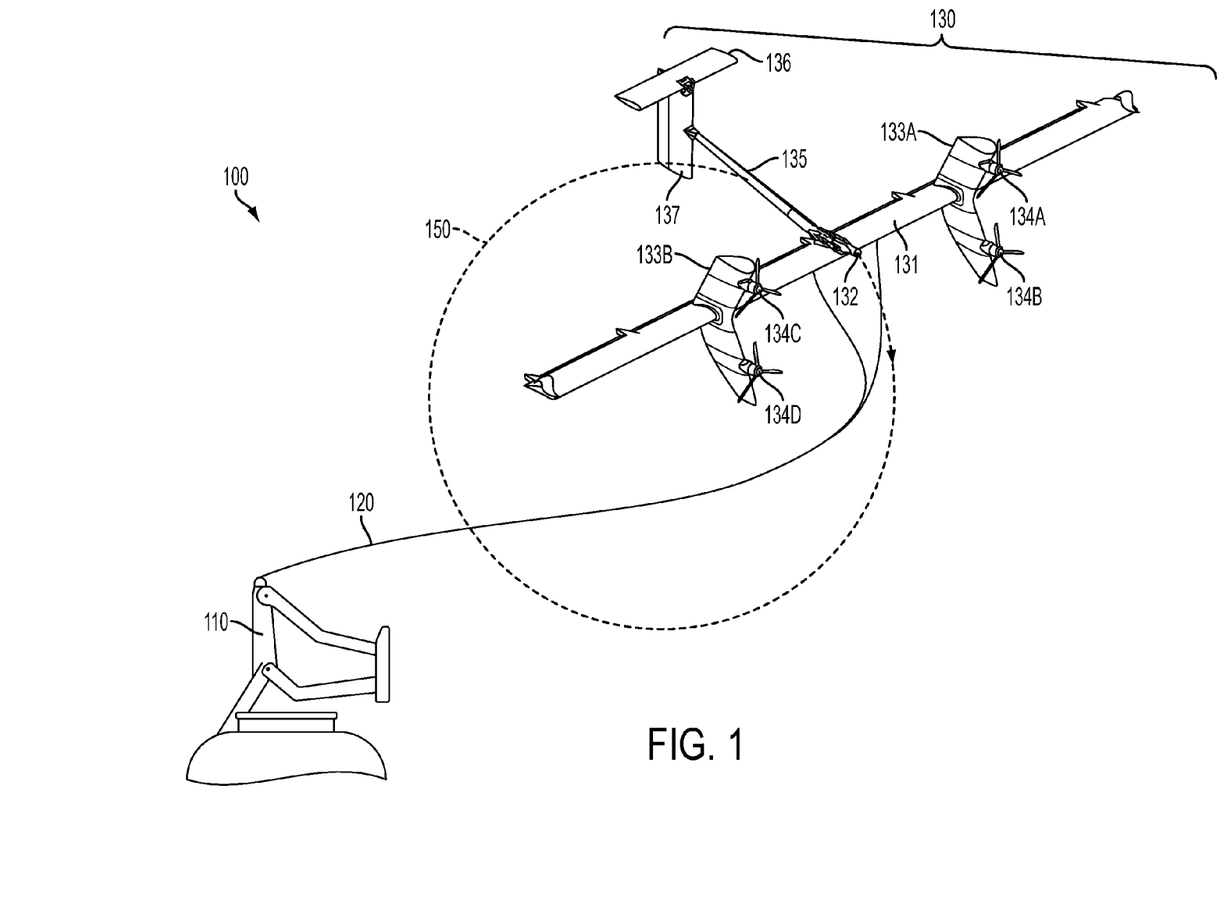
FIG. 1 depicts an Airborne Wind Turbine (AWT), according to an example embodiment.

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters. The tether may be a faired tether, comprising a wing shaped cross-section designed to minimize aerodynamic drag. An example embodiment of a faired tether is described with reference to FIG. 5 below.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of a AWT

Figure 2:
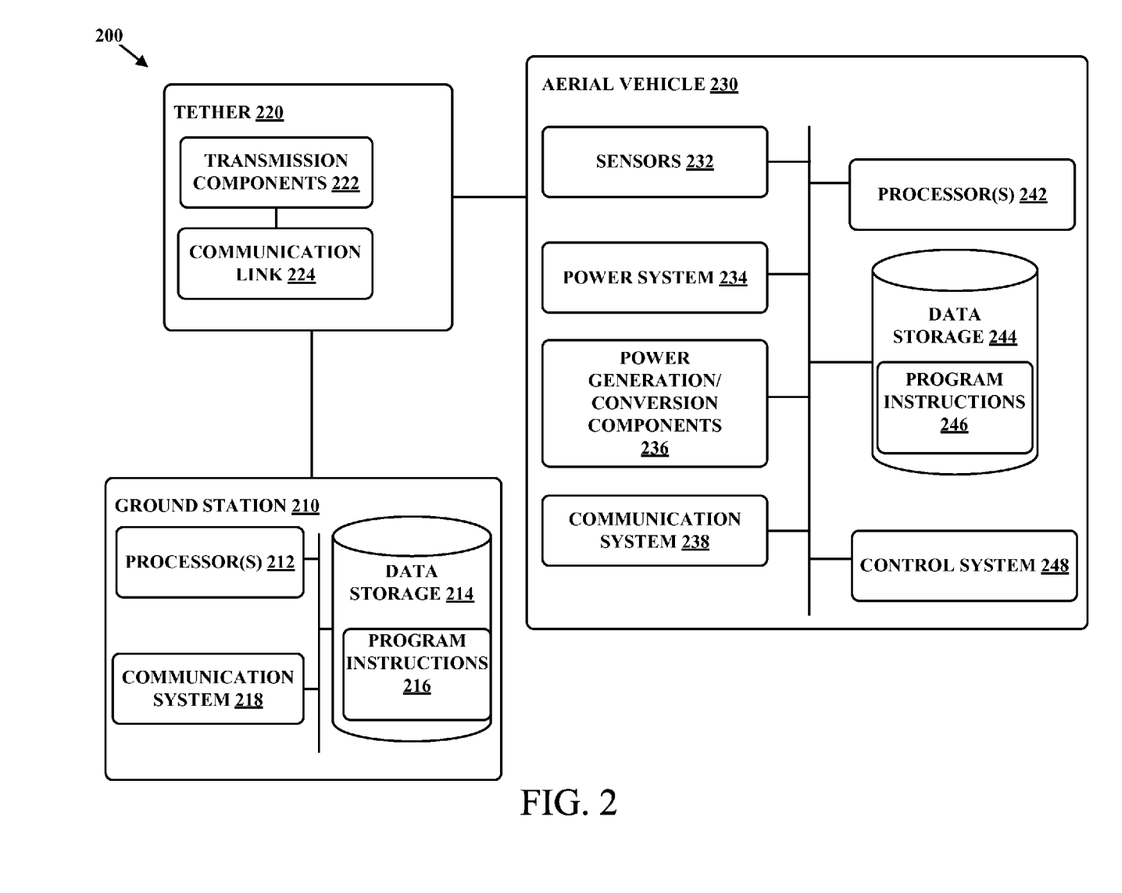
FIG. 2 is a simplified block diagram illustrating components of an AWT, according to an example embodiment.

FIG. 2 is a simplified block diagram illustrating components of the AWT 200.

The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allow for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pilot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 120.

C. Illustrative Components of a Faired Tether

Figure 3:
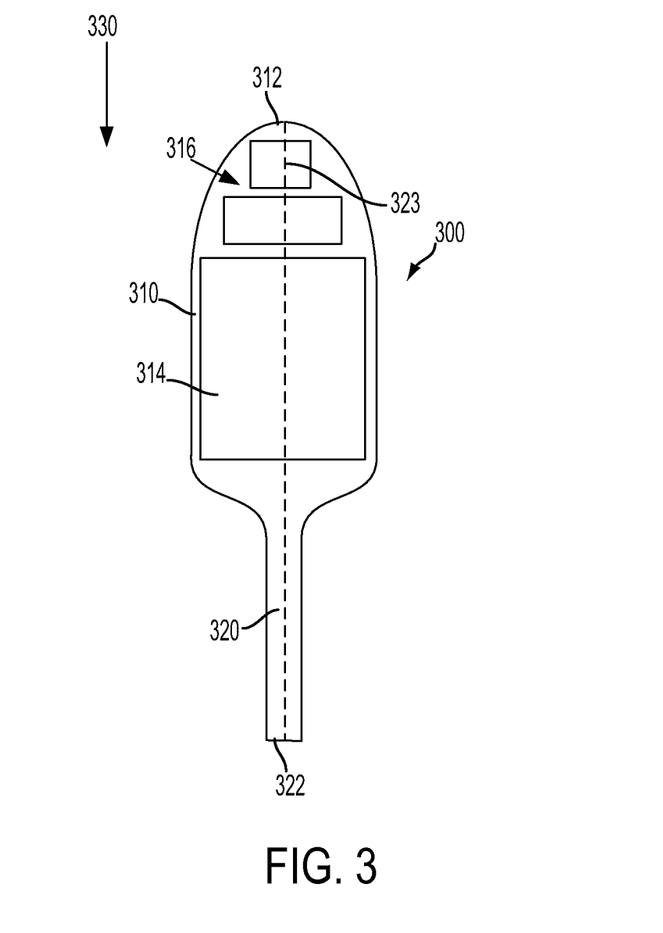
FIG. 3 depicts a cross-sectional view of a faired tether, according to an example embodiment.

FIG. 3 depicts a cross-sectional view of a faired tether 300, in accordance with an example embodiment. As shown in FIG. 3, the faired tether 300 comprises a winged shape, with a body 310 that is wider than a tail 320. The faired tether 300 comprises at one end a leading edge 312 and at an opposing end a trailing edge 322. Relative to the faired tether cross-section 300, wind as seen by the tether 300 moves in the direction indicated by arrow 330, towards the bottom of the page. Wind makes contact with the tether 300 at the leading edge 312, travels along the surface of the tether 300, and leaves at the trailing edge 322. The shape of the tether 300 is designed to reduce aerodynamic drag from wind as compared to a circular cross section tether. The major axis of the tether is shown by dashed line 323, and runs longitudinally across the faired tether 300 from the leading edge 312 to the trailing edge 322. This axis 323 serves as the bending axis when the tether 300 is positioned against a drum, as will be described below.

In one example embodiment, the body 310 may comprise a tension member 314 and a conductor portion 316 embedded in the tether 300. The tension member 314 may serve to prevent the tether 300 from being disposed to bend in a cross-wise fashion to the wind, as may be the case if the tether 300 gets turned into the wind. The tension member 314 may be made from a strong material, such as carbon fiber. For example, the tension member 314 may comprise a carbon fiber reinforced polymer (CFRP) pultrusion. A non-round pultrusion may be used for the tension member 314, such as a square or rectangular pultrusion. The minor area axis of inertia of the pultrusion may point in the direction of travel of the tether 300 in the air. Although the cross-section of the tension member 314 in FIG. 3 is shown to be rectangular, the cross-section of the core may comprise a square, an oval, an I-beam, or another profile.

The conductor portion 316 may comprise one or more coaxial conductors adapted for transmitting electrical power from an AWT, which may take the form or be similar in form to the AWT 100 or 200. In some embodiments, the shape of the leading edge 312 and/or the volume formed by the shape of the leading edge 312 such that two wires may comprise the conductor portion 316 and may be provided with an insulation layer. Other designs have used two sets of eight conductors around a cylindrical core, which must be divided up into sections to keep them flat enough to fit within the design. However, with the embodiment illustrated in FIG. 3 the wires do not need to remain as flat to fit, and, advantageously, providing only two wires on the faired tether 300 means that less insulation for the wires is needed, allowing the tether 300 to have a lighter weight. In some example embodiments, the conductors may comprise copper or aluminum. Other materials may also be envisioned. The conductors may comprise an elastic design, wherein a stranded conductor is provided at a high lay angle such that it can handle more axial elongation before yielding than a typical low laying angle conductor would. The conductor portion 316 may be concentrated at or near the leading edge 312 to prevent aeroelastic flutter of the tether 300. The conductor portion 316 is shown to be located in between the tension member 314 and the leading edge 312. The center of stability of the tether 300 is generally located in the tension member 314, thus the conductor portion 316 or at least one wire of the conductor portion 316 may also serve as a mass balance in front of the tension member.

As depicted in FIG. 3, the transition from the body 310 to the tail 320 comprises a pronounced inward curvature to allow for stacking against a stepped drum, as will be discussed with respect to FIGS. 4-5$d$ below. The term "pronounced inward curvature," as used in this disclosure, refers to a radius of curvature within the range of 5 mm-20 mm in some example embodiments, within the range of 6 mm-12 mm in other example embodiments, and/or one or more deviations that do not significantly impact the mating of a body portion of a tether against a stepped drum as described herein and/or and against a tail of the tether as the tether is layered in a staggered fashion around a stepped drum as described herein. In some example embodiments, the pronounced inward curvature may be 10 mm. The pronounced inward curvature may match or be similar to the curvature of the leading edge 312, for example.

Such a pronounced inward curvature is greater than might be sought if only the aerodynamics of the tether were considered. However, the pronounced inward curvature is a compromise between aerodynamic considerations (e.g., providing minimum drag) and stackability against the stepped surface of a drum and other portions of the faired tether 300, as will be described and shown below. The tail 320, which both increases aerodynamic stability and moves the aerodynamic center rearwards, towards the trailing edge 322, makes it possible to carry compressive forces of successive wraps of the faired tether 300 around a drum surface with less mass of internal material required to carry the load. The materials comprising the faired tether 300 are preferably able to handle a compressive force of a subsequent wrap of the tether (as will be discussed in further detail below) while pressed against a drum.

Thus, as described above, such a faired tether design provides for a tesselatable shaped tether which is also aerodynamic and maintains the tension balance required to avoid aeroelastic flutter.

D. Illustrative Components of a Drum

Figure 4:
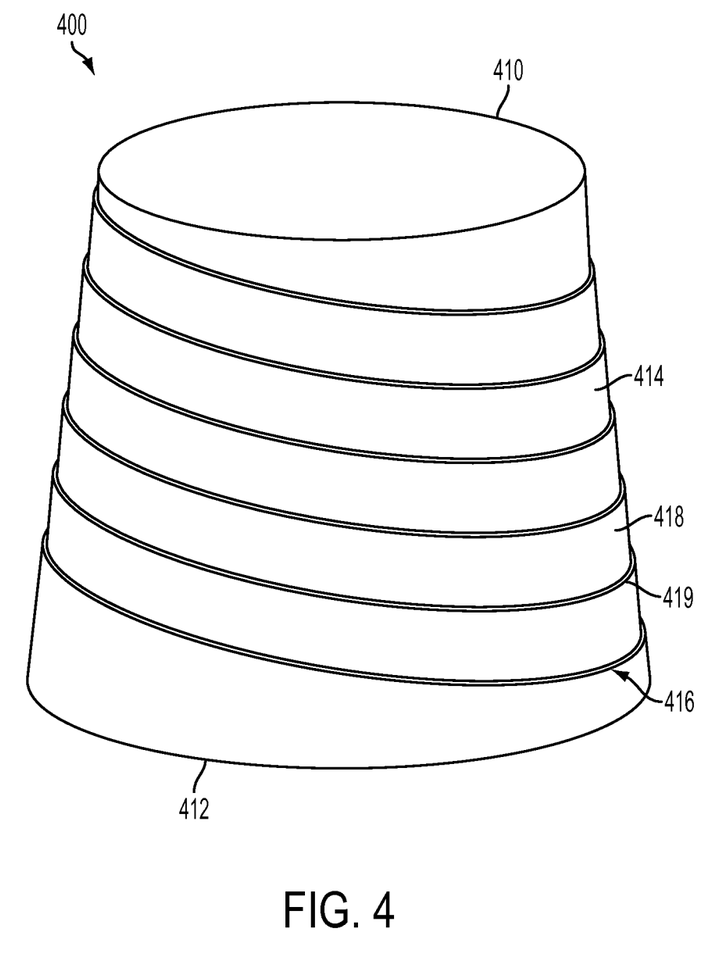
FIG. 4 depicts a drum, according to an example embodiment.

FIG. 4 depicts a perspective view of a drum 400, according to an example embodiment. The drum 400 is provided to receive a tether, such as the tethers 120, 220, and 300.

The drum 400 comprises a top edge 410, a bottom edge 412, and a helical shaped body 414 extending in the longitudinal direction, along the height of the drum 400 from at or near the top edge 410 to at or near the bottom edge 412. The helical shaped body provides for a plurality of grooves or steps 416 along an exterior surface of the body 414. Each step 416 defines a vertical portion 418 and a ledge 419. In some example embodiments, the helical shaped body 414 may extend in the opposite direction from that shown in FIG. 4.

The steps 416 are sized and shaped to accommodate the tail portion 320 of a faired tether, such as the faired tether 300, so that when the tail portion 320 rests near or adjacent to the vertical portion 418 of a step 416, the trailing edge 322 sits above the ledge 419. In some embodiments, a cusp comprising a lip or curved wall may be present on the end of each ledge 419 to prevent a wrapped tether from sliding out of position on the ledge 419 and down the surface of the drum 400. In other embodiments, the ledge 419 may comprise a slope that does not positively constrain the tether but relies on either friction or an increased radius at which the tether would lay to prevent the tether from sliding out of position on the ledge 419 and down the surface of the drum 400.

The drum 400 may be manufactured by extruding a material in a helical form and then sending the extruded material through a roll bending machine to adjust for tighter curvatures of the helical form along the height of the drum. In one example embodiment, the drum 400 may comprise a spiral wound piece of extruded metal, such as aluminum. In some example embodiments, the drum 400 may further comprise a coating such as anodization, or a layer or insulator to prevent tether-to-tether shorting through pinholes, or other damage to the tether.

E. Systems for Winding a Faired Tether Around a Drum

Figure 5A:
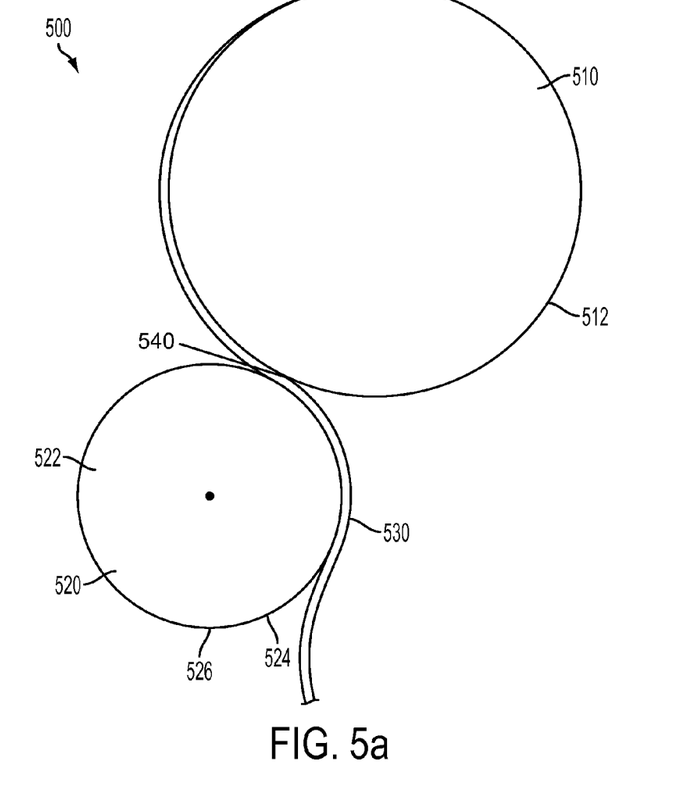
FIG. 5a depicts a system for winding a tether, according to an example embodiment.

FIG. 5a depicts a system 500 for winding a tether, according to an example embodiment. FIG. 5A shows a top view of the system 500. The system 500 may include a drum 510, one or more level winds 520, and a tether 530. The tether 530 may take the form of or be similar in form to the tethers 120, 220, or 300, and may be a faired tether.

The one or more level winds 520 serve as guiding devices, and may comprise any of a number of level winds or other guiding devices. A motor may be mounted to and configured to power the level wind 520. The level wind 520 shown in FIG. 5a is provided to facilitate proper alignment of the tether 530 with a step on the drum 510 as the tether 530 begins to wrap around the drum 510. The level wind 520 in FIG. 5a is positioned parallel and near to the drum 510, such that when the tether 530 is guided around the level wind 520, a portion of the tether 530 at location 540 transitions from the level wind 520 to the drum 510.

The level wind 520 comprises a top 522, a bottom 523 (shown in FIG. 5b), and a cylindrical body 524 (also shown in FIG. 5b) extending from the top 522 to the bottom. The cylindrical body 524 comprises an exterior surface 526.

Figure 5B:
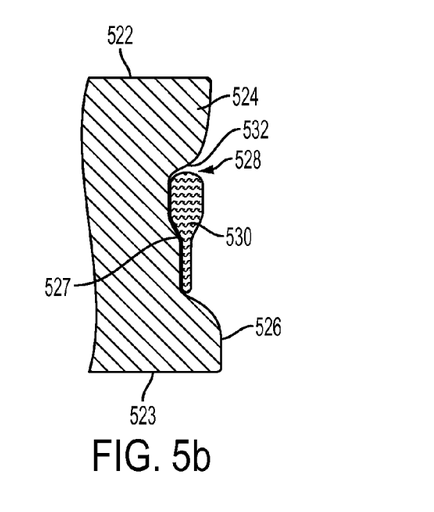
FIG. 5b depicts a detailed view of a channel on a level wind to receive a faired tether, according to an example embodiment.

The exterior surface 526 may include a channel 528 as shown in FIG. 5b, which depicts a detailed side view of a channel 528 along the exterior surface 526 of the cylindrical body 524. The channel 528 is configured to receive and mate with the faired tether 530. Thus, when the tether is positioned on the level wind 520, a leading edge 532 of the tether 530 is positioned toward the top 522 of the level wind 520. In some example embodiments, the channel 528 may comprise one or more undercuts 527, as shown in FIG. 5b, to encourage the tether 530 to lay at the correct location on the level wind while winding.

The drum 510 may take the form of or be similar in form to the drum 400, and may thus comprise a top edge 512, a bottom edge (not shown), and a helical shaped body (not shown) extending therebetween, forming steps along the longitudinal axis of the drum.

In operation, when the tether 530 is to be stored on the drum 510, the tether 530 is first aligned with the wing of the AWT, wherein the wing points upward, in the direction of the top edge 512 of the drum 510, in preparation for winding the tether 530. In this configuration, the leading edge 532 of the tether points upward as well. The tether 530 is then drawn into the channel 528 of the rotating level wind 520 and is positioned such that the leading edge 532 of the tether 530 is directed toward the top 522 of the level wind 520, as described above. The faired tether is moved about 90 degrees around the level wind, and is then guided by the level wind 520 toward the drum 510. In the example embodiment of FIG. 5c, to guide the tether 520 the level wind 520 may rotate or turn in a counter-clockwise direction. The tether 530 makes contact with a step 516 on the drum 510 at location 540, and proceeds to be spooled or wrapped around the drum 510 as the level wind 520 continues to rotate and guide the tether 530.

The tether 530 progresses to be wrapped around the drum 510 in a circumferential and longitudinal path downward from at or near the top edge 512 of the drum 510 to at or near the bottom edge (not shown) of the drum 510, forming layers around the exterior surface of the drum as the tether 530 moves down the helical shaped body 514. The first layer of the wrapped tether 530 may extend from a point on a first step to a point where the first step transitions into the second step below the first step, via the helical pattern. As the tether 530 continues to wrap around the second step, the tether 530 forms a second layer as shown and discussed with reference to FIG. 5c, below.

Figure 5C:
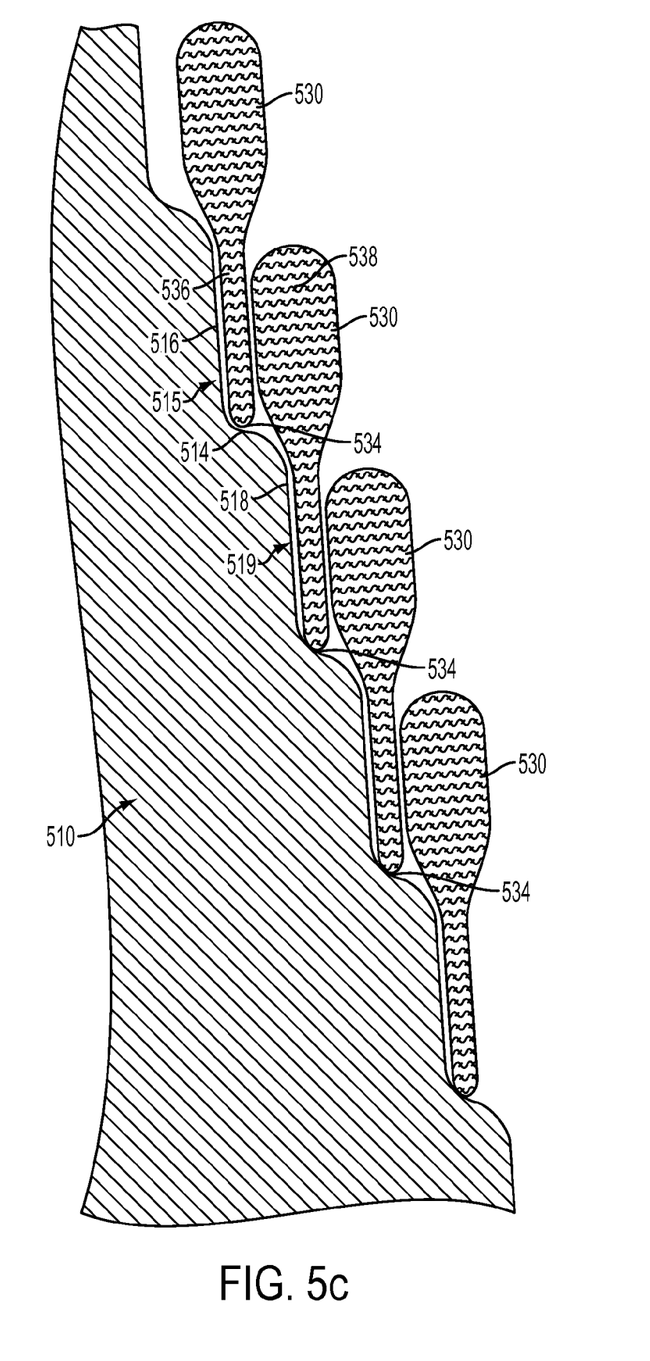
FIG. 5c depicts a detailed view of a tether wrapped around a drum, according to an example embodiment.

FIG. 5c depicts a detailed partial view of the tether 530 wrapped around the drum 510 in successive layers. As shown in FIG. 5c, a trailing edge 534 of the tether may sit on top of or near to a ledge 514 of a first step 515 of the drum 510, and one side of a tail 536 of the tether 530 may be near or adjacent to a vertical portion 516 of the first step 515. As the tether 530 continues to be wrapped around the drum 510, a second layer of the tether 530 forms around the drum 510. At least a portion of a body 538 of the tether 530 overlaps with at least a portion of the tail 536 from the first layer. The transition from the body 538 to the tail 536, which may comprise a pronounced inward curvature as described with reference to FIG. 3, may rest against or be near to a corresponding curved transition between the ledge 514 of the first step 515 and a vertical portion 518 of a second step 519. Four layers of tether are depicted in FIG. 5c; however, there may be more or less layers of tether wound around a drum. In some example embodiments, the tether 530 may be stacked in a different orientation, where at least a portion of the body 538 of the first layer is pressed against the drum 510 and at least a portion of the tail 536 overlaps with at least a portion of the body 538 of the first layer.

In another example embodiment, instead of the drum of FIG. 5c comprising a smaller diameter with each revolution of the helix, the steps may be angled in a direction facing outward from the drum to allow the drum to comprise the same diameter with each step.

Figure 5D:
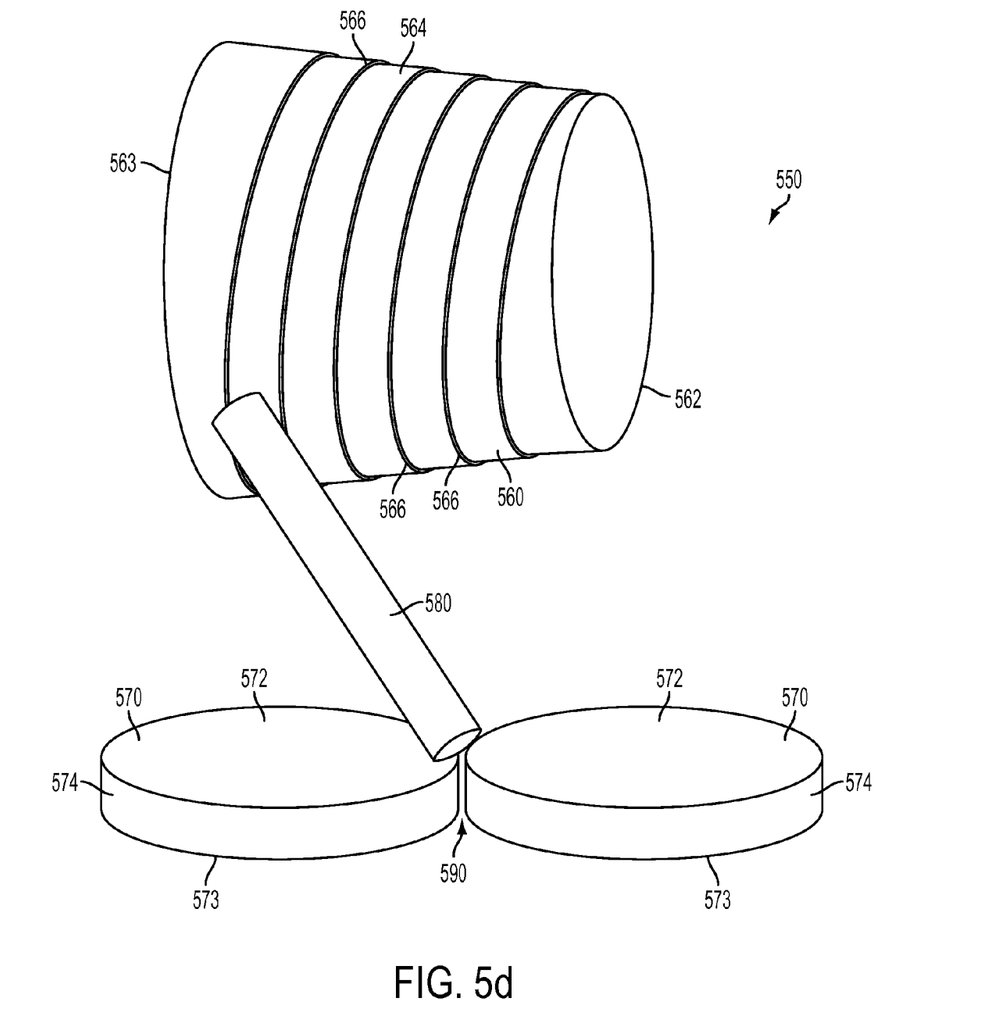
FIG. 5d depicts a system for winding a tether, according to an example embodiment.
Figure 5E:
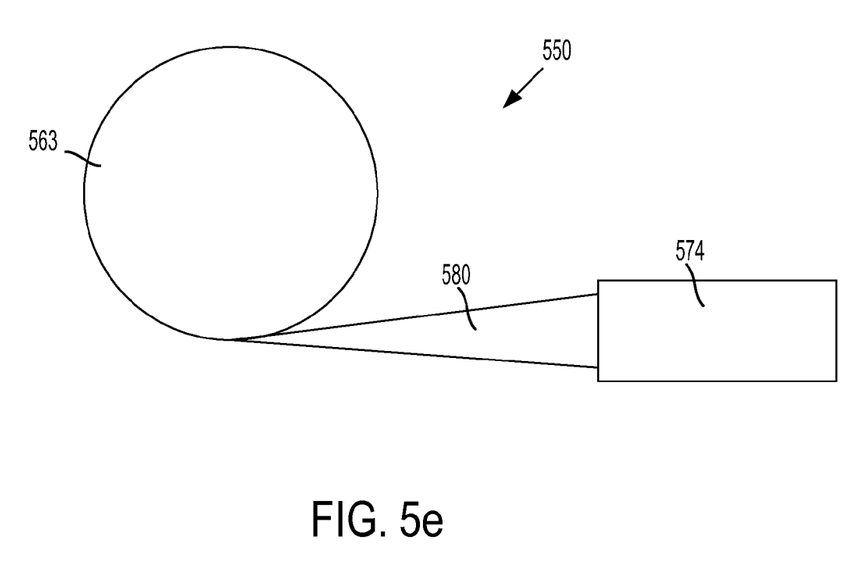
FIG. 5e depicts a side view of the system of FIG. 5d, according to an example embodiment.

FIGS. 5d-5e depict a system 550 for winding a tether, according to an example embodiment. The system 550 may include a horizontal axis drum 560, a plurality of level winds 570, and a tether 580. The tether 580 may take the form of or be similar in form to the tether 530, and may be a faired tether.

The level winds 570 may take the form or be of similar form to the level wind 520. The system 550 depicts two level winds 570. Each level wind 570 comprises a top 572, a bottom 573, and a cylindrical exterior surface 574. The level winds 570 are positioned parallel to and near each other in the example embodiment of FIG. 5d, allowing for a gap at point 590. The gap at point 590 is sufficient for the tether 580 to touch a portion of each exterior surface 574 of each level wind 570 as the tether 580 moves between the level winds 570 at point 590.

The drum 560 may take the form of or be similar in form to the drums 400 and 510, and may thus comprise a top edge 562, a bottom edge 563, and a helical shaped body 564 extending therebetween forming steps 566.

In the system 550, the tether 580 is oriented vertically as it is engaged with the level winds 570 (e.g., moving through the gap between the level winds 570 at point 590), in the direction toward the top 572 of the level winds 570, and continues to be guided by the level winds 570 and pulled in a direction toward the drum 560. The tether 580 may be rotated about 90 degrees (e.g., axially rotated) after moving through the level winds 570 prior to lying against the drum surface. Such a rotation of the tether 580 is shown in FIG. 5e, wherein the tether moves through the level winds at a first orientation and twists or is rotated about 90 degrees to a second orientation. The tether 580 may wrap around the drum surface in the manner depicted in FIG. 5c. The tether 580 remains flat against the drum surface due to its bending and the fact that the tether 580 is being pulled against the drum surface during the winding process.

The drum design and systems described above with reference to FIGS. 3-5d provide for a controlled staggering of a tether as the tether is wrapped around a drum, minimizing subjecting the tether to crushing, scrubbing, and wear against other portions of the wrapped tether.

Additionally, the systems described above allow for a tether to bend around its major axis on the drum, thus operating at a smaller bending radius.

ILLUSTRATIVE METHOD

Figure 6:
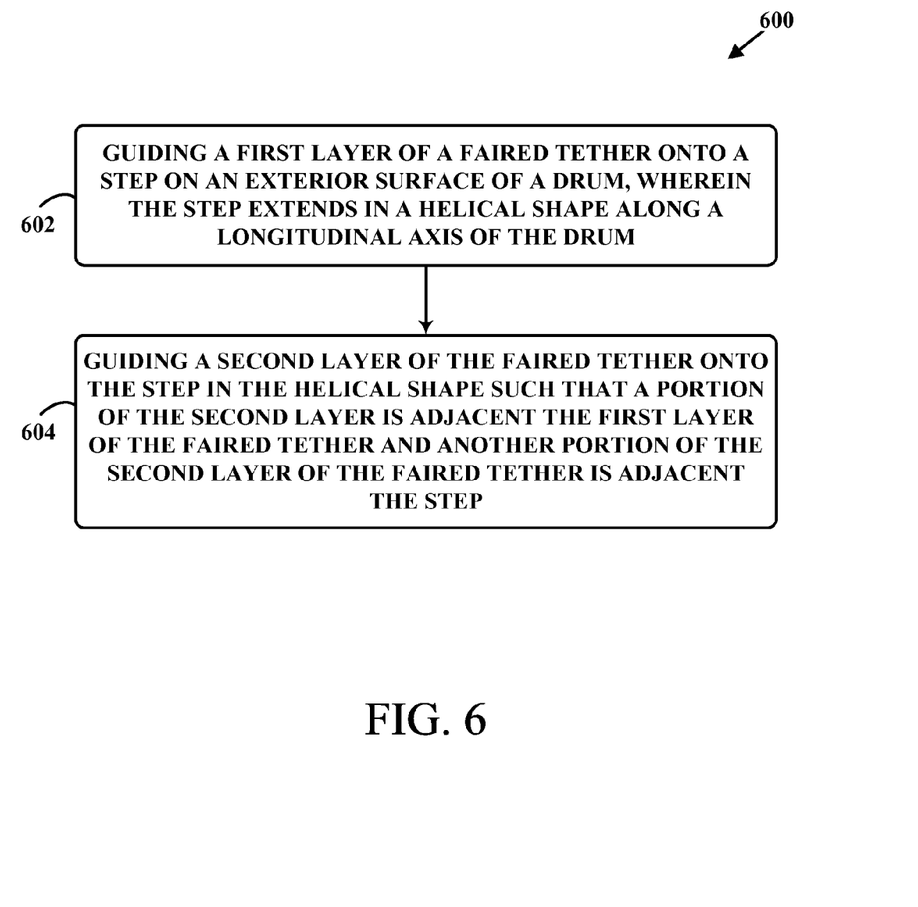
FIG. 6 is a flowchart of a method, according to an example embodiment.

FIG. 6 is a flowchart illustrating a method 600, according to an example embodiment. The method 600 may be used in wrapping a tether around a drum. Illustrative methods, such as method 600, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 600 may be performed by the control system 248.

As shown by block 602, method 600 involves guiding a first layer of the faired tether onto a step on an exterior surface of the drum, wherein the step extends in a helical shape along a longitudinal axis of the drum, wherein guiding the first layer comprises mating the faired tether with the step. The faired tether may comprise a leading edge, a body portion, a tail portion, and a trailing edge, and the tail portion and the trailing edge of the tether may be mated against a vertical portion and a ledge of the step, respectively. At block 602, the faired tether may take the form of any of the tethers 120, 220, 300, 430, and 480, and may be associated with an aerial vehicle such as the aerial vehicle 130. The drum may take the form of any of the drums 400, 410, and 460.

As shown by block 604, method 600 involves guiding a second layer of the faired tether onto the step in the helical shape such that a portion of the second layer is adjacent the first layer of the faired tether and another portion of the second layer of the faired tether is adjacent to the step.

The faired tether may comprise a curved transition between the wider body portion and the narrower tail portion. This curved transition may also mate with a corresponding curved transition between the ledge of the step and a vertical portion that forms a subsequent step and that is below the ledge.

CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

The invention claimed is:

1. A system comprising:
 a faired tether connected to an aerial vehicle at one end of the faired tether, wherein the faired tether comprises a body portion and a tail portion and a curved transition between the body portion and the tail portion; and
 a drum comprising a top, a bottom, and an exterior surface, with one or more steps forming a helical shape extending along the exterior surface,
 wherein the helical shape is configured to stack layers of the faired tether in a staggered manner when the faired tether is wrapped around the one or more steps of the drum.

2. The system of claim 1, further comprising:
 one or more level winds comprising a channel for receiving the faired tether and configured to guide the faired tether to mate with a step of the one or more steps of the drum.

3. The system of claim 2, wherein the faired tether comprises an aerodynamic, tesselatable shape comprising a carbon fiber material.

4. The system of claim 2, further comprising a control station that executes instructions to move the tether through the one or more level winds.

5. The system of claim 1, wherein the helical shape extends along a longitudinal axis of the drum.

6. The system of claim 5, wherein the helical shape is configured to stack layers of the faired tether along the longitudinal axis of the drum.

7. The system of claim 1, wherein the one or more steps comprises a vertical portion and a ledge, and wherein when the faired tether is mated with a step of the one or more steps, a trailing edge of the tail portion of the faired tether rests on the ledge.

8. The system of claim 7, wherein when the faired tether is mated to a step of the one or more steps, a bending axis of the faired tether is substantially parallel to the vertical portion of the step.

9. The system of claim 1, wherein the faired tether comprises a tension member, the tension member comprising a non-round pultrusion of carbon fiber reinforced polymer with a minor axis of inertia pointing in a direction of travel of the faired tether.

10. The system of claim 9, further comprising at least one wire located in front of the tension member to provide a mass balance for the faired tether and prevent aeroelastic flutter.

* * * * *